United States Patent
Van Dewerker

(12) 
(10) Patent No.: US 6,302,129 B1
(45) Date of Patent: Oct. 16, 2001

(54) PULSE SENSING FEEDBACK CONTROL SYSTEM

(76) Inventor: John S. Van Dewerker, 5566 E. Vista del Rio, Anaheim, CA (US) 92807

(*) Notice: Subject to any disclaimer, the term of this patent is extended or adjusted under 35 U.S.C. 154(b) by 0 days.

(21) Appl. No.: 09/586,714

(22) Filed: Jun. 5, 2000

(51) Int. Cl.$^7$ ................................. G05D 7/03; F17D 3/01
(52) U.S. Cl. ..................... 137/12; 137/7; 137/624.12; 700/282; 700/301
(58) Field of Search ................. 137/7, 12, 88, 137/624.12, 624.14; 700/282, 285, 301

(56) References Cited

U.S. PATENT DOCUMENTS

| | | |
|---|---|---|
| 3,716,949 | 2/1973 | Price et al. . |
| 4,185,541 | 1/1980 | Milberger et al. . |
| 4,230,196 | 10/1980 | Snead . |
| 4,343,365 | 8/1982 | Rajagopal et al. . |
| 4,360,807 | 11/1982 | Zettergren . |
| 4,476,837 | 10/1984 | Salzgeber . |
| 4,721,028 | 1/1988 | Lucas et al. . |
| 4,887,499 | 12/1989 | Kipfelsberger . |
| 5,113,949 | 5/1992 | Ohkubo et al. . |
| 5,269,335 * | 12/1993 | Heitman ............................ 137/12 |
| 5,421,240 | 6/1995 | Ohta et al. . |
| 5,455,769 | 10/1995 | Panoushek et al. . |

* cited by examiner

Primary Examiner—Michael Powell Buiz
Assistant Examiner—Ramesh Krishnamurthy
(74) Attorney, Agent, or Firm—Gene Scott-Patent Law & Venture Group

(57) ABSTRACT

The present invention provides a feedback control system using at least one operating personnel for controlling a system or a function in a system. The control results from sequential manual interruption by the operator of the fluid flow at the discharge end of a flowing system within a preset time period. As the liquid flow is interrupted, changes in flow characteristics, such as those affecting flow or pressure, for example, are instantly caused within the system. A transducer connected to the system senses these changes in flow characteristic and subsequently transduces them into electrical impulse signals that correspond directly to the sequential interruptions occurring at the discharge end of the system. An electronic circuit counts these electrical impulses, and causes relay switches to change state, causing electromechanical functions in the system to occur. Initiating these functions is the objective and purpose of the operator's sequential interrupting of the flow in the system discharge end and the changes are made to be observed by the operator who is a key component of this feedback control system.

18 Claims, 2 Drawing Sheets

PULSE SENSING FEEDBACK CONTROL SYSTEM

BACKGROUND OF THE INVENTION

1. Field of the Invention

This invention relates generally to pulse sensing feedback control systems, and more particularly to a pulse sensing feedback control system with features adapted for remote operator control of a distant system by utilizing a pressure sensitive control device that detects and counts pulses produced manually in liquid or gas flowing through a pipe.

2. Description of Related Art

The following art defines the present state of this field:

Price et al., U.S. Pat. No. 3,716,949 describes a feed rate and positioning control system for a machine tool which utilizes an electrohydraulic pulse motor to move a grinding wheel support at preselected rates and for predetermined distances during a grinding operation. A control counter is arranged, via rate selecting switches, to select pulses of various predetermined pulse repetition rates for controlling the rates at which the electrohydraulic pulse motor moves during a grinding operation. End point selecting switches and comparators are provided for determining the distances moved by the support during a grinding operation to signal the control counter to change rates or to start a swell period. Swell selecting switches, responsive to the control counter, are provided to establish the duration of swell periods between application of selected rates and to signal the control counter at the end of each swell period, including a spark out period at the end of the grinding operation.

Milberger et al., U.S. Pat. No, 4,185,541 describes a method and apparatus for hydraulically controlling subsea well equipment, such as valve operators, connectors, and other hydraulically actuated devices, with a significantly reduced number of hydraulic pressure source lines from the surface to the subsea location of said well equipment. The apparatus includes a multi-mode subsea switching valve having a plurality of module-like sections, each section having an inlet port, a vent port and a plurality of outlet ports. When installed, this valve preferably is located near the subsea well, and a source of hydraulic pressure and a plurality of hydraulic switches, all located on a surface vessel or other surface facility, are connected to the valve's inlet ports by means of a relatively small number of hydraulic pressure source lines. A relatively large number of hydraulic outlet lines interconnect the valve's outlet ports and the subsea well equipment so that in each of its functional modes the valve directs fluid pressure to a different set of subsea devices. The valve is switched from one mode to another by a pulse of hydraulic pressure exerted on an operator apparatus that is connected to the valve's flow control element, and these modes are changed in a manner such that the position of the valve's flow control element is always known.

Snead, U.S. Pat. No. 4,230,196 describes a loader which includes a lift arm assembly, raised by hydraulic lift cylinders and carrying a load bucket. Alignment members mounted respectively on the loader frame and lift arm assembly, and visible to the loader operator, identify the weigh position of the lift arm assembly. A pressure to voltage transducer is mounted on one lift cylinder, and is connected in a bridge circuit producing a DC voltage output. The bridge circuit output signal, proportional to the bucket load, is fed to an amplifier, whose output is passed to an analog-to-frequency converter producing pulses at a frequency proportional to the bucket load. An electronic clock allows the converter output pulses to pass through an AND gate to a bucket counter which displays the bucket load, and is automatically reset to zero. The converter pulses are passed to an accumulator counter through a second AND gate. The accumulator counter accumulates the weight of several bucket loads which are loaded onto a transport vehicle; and is reset manually after the vehicle is loaded.

Rajagapal et al., U.S. Pat. No. 4,343,365 describes a control system for a tractor hydraulical power lift system having an electrohydraulic actuator coupled to a main hydraulic valve, comprising a feedback electronic control circuit including a circuit for mathematically combining a plurality of transducer generated signals into a command signal. The command signal comprises the output signal of a first differential summing device receiving a first input signal for a control handle transducer from which is subtracted a second input signal produced as the output of a signal mixer that combines input signals from a rockshaft transducer, a draft selector transducer and a draft load transducer. The command signal and a signal from a transducer coupled to the electrohydraulic actuator are fed into a differential summing device that has as its output an error signal representing the actual and desired positions of an implement to be positioned by the power lift system. The control circuit includes a sample-and-hold unit adapted to receive the error signal. Clock logic transmits the error signal at predetermined times as determined by a sampling frequency clock from the sample-and-hold unit to the electrohydraulic actuator.

Zettergren, U.S. Pat. No. 4,360,807 describes a device for remote control of hydraulic or pneumatic machine tools, comprising a selector valve for different hydraulic functions provided with a number of spring-centered slides and two electrohydraulic or -pneumatic converters connected to each slide, and comprising a control unit capable by electric impulses to transfer orders via a cable to a receiver unit capable to control the converters. According to the invention, the control unit comprises a ring counter, which is controlled by an oscillator and capable to emit in turn a scanning signal to each of a number of transducers, which are manually actuated by levers, each transducer being capable during the duration of the scanning signal to convert the direction and deflection from a centered zero position of the associated lever into two signals, one of which corresponds to said direction and one to said deflection. An encoder is provided to allot an address to the output signals. The receiver unit comprises a decoder capable to emit a decoded signal to a signal converting circuit thereby addressed where two such circuits are corresponded by a transducer. The circuits are connected each to an amplifier, each of which is capable to control one of said converters.

Salzgeber, U.S. Pat. No. 4,476,837 describes a fuel pump timing system having a hydraulic pressure transducer mounted for sensing a reaction hydraulic pulse to each fuel injection pressure pulse, a stepper motor for adjusting the fuel injection pump timing, engine sensors for sensing an engine reference position and certain engine operation data and a microprocessor connected to the transducer and engine sensors and operable for calculating the optimum and actual angles of fuel injection and for controlling the stepper motor to adjust the fuel injection pump timing in accordance with the difference between the optimum and actual angles of fuel injection.

Lucas et al., U.S. Pat. No. 4,721,028 describes a control system for controlling the movement of the slide of a hydraulic press of the type having a main cylinder containing a piston mounting the slide. The control system comprises an electronic processor, a pressure transducer to measure the pressure of hydraulic fluid applied to the piston to move the slide downwardly, a position encoder coupled to the slide to determine the vertical position of the slide, and a hydraulic circuit to supply hydraulic fluid under pressure to the cylinder to move the piston and slide upwardly and downwardly. The hydraulic circuit comprises a plurality of cartridge valves having controls actuable by outputs from the processor. The processor is capable of handling inputs, including inputs from the pressure transducer and position encoder, and outputs to control the hydraulic circuit to shift the slide upwardly and downwardly at different preselected speeds, to reverse downward travel of the slide at a preselected point based on either slide position or tonnage applied by the slide to a workpiece, and to adaptively optimize decompression of the hydraulic fluid in the hydraulic system at the end of downward movement of the slide.

Kipfelsberger, U.S. Pat. No. 4,887,499 describes a power screwdriver with torque limiter, with a drive unit and a secondary transmission, with an output shaft for the attachment of a keyed bit. According to the invention the drive unit is a pneumatic motor with a compressed-air intake and a compressed-air outlet, whereby the differential pressure between the compressed-air intake and the compressed-air outlet (measuring circuits) taken as the measure of the torque produced by the power screwdriver. The differential pressure is measured in a differential pressure measuring device and the measure signal is transmitted to a control unit. The control unit contains a comparator unit which compares the measured differential pressure signal with a set value of differential pressure (adjusting potentiometer) and transmits a switching signal to a switch unit (solenoid valve) to switch off the power screwdriver when the compared values become equal. In this manner a simple calculation of torque is achieved by means of a differential pressure measurement in combination with a simple switch-off possibility. In further embodiments the rotational speed of the pneumatic motor is used additionally in the determination of torque.

Ohkubo et al., U.S. Pat. No. 5,113,949 describes a tightening control apparatus for a torque wrench including a pressure detecting device for detecting an admission pressure supplied to a torque wrench. A pressure change detecting device determines a change in pressure detected by the pressure detecting device. A striking signal output device outputs a striking signal when the change reaches a reference value.

Ohta et al., U.S. Pat. No. 5,421,240 describes torque control of high accuracy by detecting the oil pressure at the time of the generation of a pulse which forms the basis of the generated torque for a torque wrench and using the data thus obtained the effect torque control. Oil pressure pulses generated in a pulse generating mechanism by the rotation of an air motor are transmitted to a hydraulic cylinder by a piston, a rod and a piston. In addition, a pressure sensor installed in the hydraulic cylinder detects the oil pressure pulses and its signal is used to switch a switching valve, whereupon a stopping switching valve and a stopping differential pressure valve are successively switched, stopping the feeding of air to the air motor while cutting of the passage of electric current from a battery to an electric control circuit.

Panoushek et al., U.S. Pat. No. 5,455,769 describes a control system for controlling the height of a harvesting head on a combine is disclosed herein. The control system includes operator controlled signal generators which permit an operator to independently set the maximum velocity at which the harvesting head is raised and lowered. The signal generators are connected to the system controller which controls the operation of a hydraulic valve which controls hydraulic lift cylinders which raise and lower the harvesting head. The hydraulic valve is controlled with a pulse-width modulated signal. The width of the pulse is related to the direction the head is being moved (raised or lowered), and the maximum speed at which the head is to be moved. To reduce jerking upon initiation of head movement and termination of head movement, the controller determines acceleration and deceleration rates for head movement initiation and termination. The acceleration and deceleration determinations are based upon the signals produced by the signal generators.

It is often desired that control of systems, machines or functions of machines can be effected from a distance, so that an operator can remotely initiate changes in operation of a system or a machine. The prior art includes various apparatuses which use hydraulic pulse sensing for valve control, system feedback, pressure and motor control of the hydraulic system producing the pulse, including an electrohydraulic pulse produced in a controlled hydraulic system to activate response functions in the same hydraulic system. However the prior art does not teach that an operator can use hydraulic pulse sensing to remotely control a separate system, where the function of the remote system is not directly related to the function of the hydraulic system itself. The present invention fulfills these needs and provides further related advantages as described in the following summary.

SUMMARY OF THE INVENTION

The present invention teaches certain benefits in construction and use which give rise to the objectives described below.

The present invention provides a feedback control system using at least one operator for remote control of a system or a function of a system. The operator remotely controls the system by producing manual pressure pulses in hydraulic system fluid; preferably within a preset time period. As the liquid flow is pulsed or interrupted, flow characteristics, such as liquid flow or pressure, for example, instantly changes within the hydraulic system. These changes in flow characteristics are sensed by a transducer connected to the hydraulic system and subsequently transduced into electrical impulse signals that correspond directly to the sequential interruptions occurring in the discharge end of the hydraulic system. The electrical impulses are counted by an electronic device, and when a predetermined number of electrical impulses are counted within a preset time, the electronic device causes an electrical relay switch to close; causing, in turn, electromechanical functions to begin, such as secondary system functions, for instance. Initiating these functions is the objective and purpose of the operator's sequential pulsing of the liquid flow at the hydraulic system discharge end, or elsewhere in the hydraulic line.

A primary objective of the present invention is to provide a pulse sensing feedback control system having advantages not taught by the prior art.

Another objective is to provide a device allowing remote control of a secondary system through manual manipulation of the fluid flow in a primary hydraulic system.

A further objective is to provide remote operator control of a hydraulic pumping system by enabling the number of pressure impulses in the fluid to be counted without the use of wires or other communication means.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
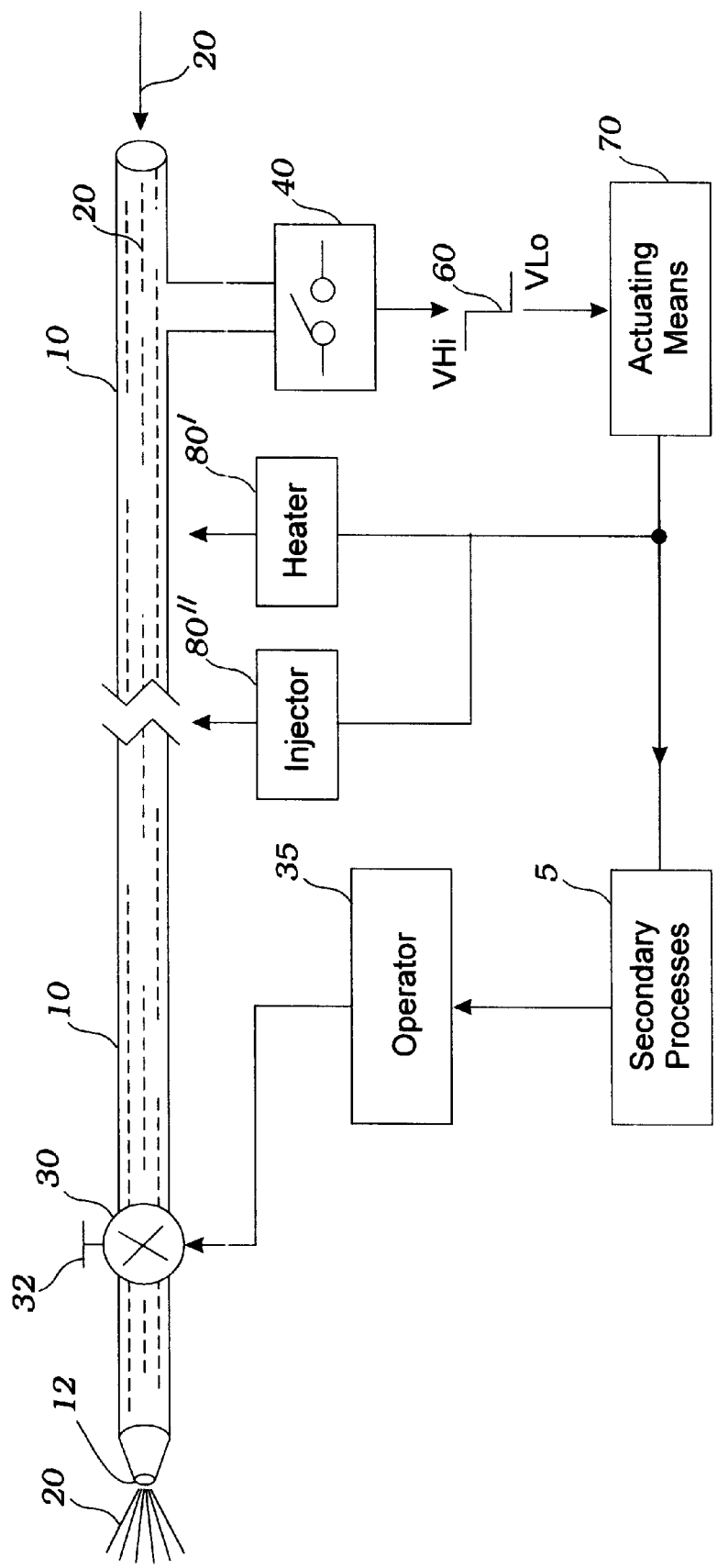
FIG. 1 is a block diagram of a transducing device operation in a primary system of the present invention which is enabled for detecting fluid pulses transmitted within the fluid, and for producing an output signal related thereto.
Figure 2:
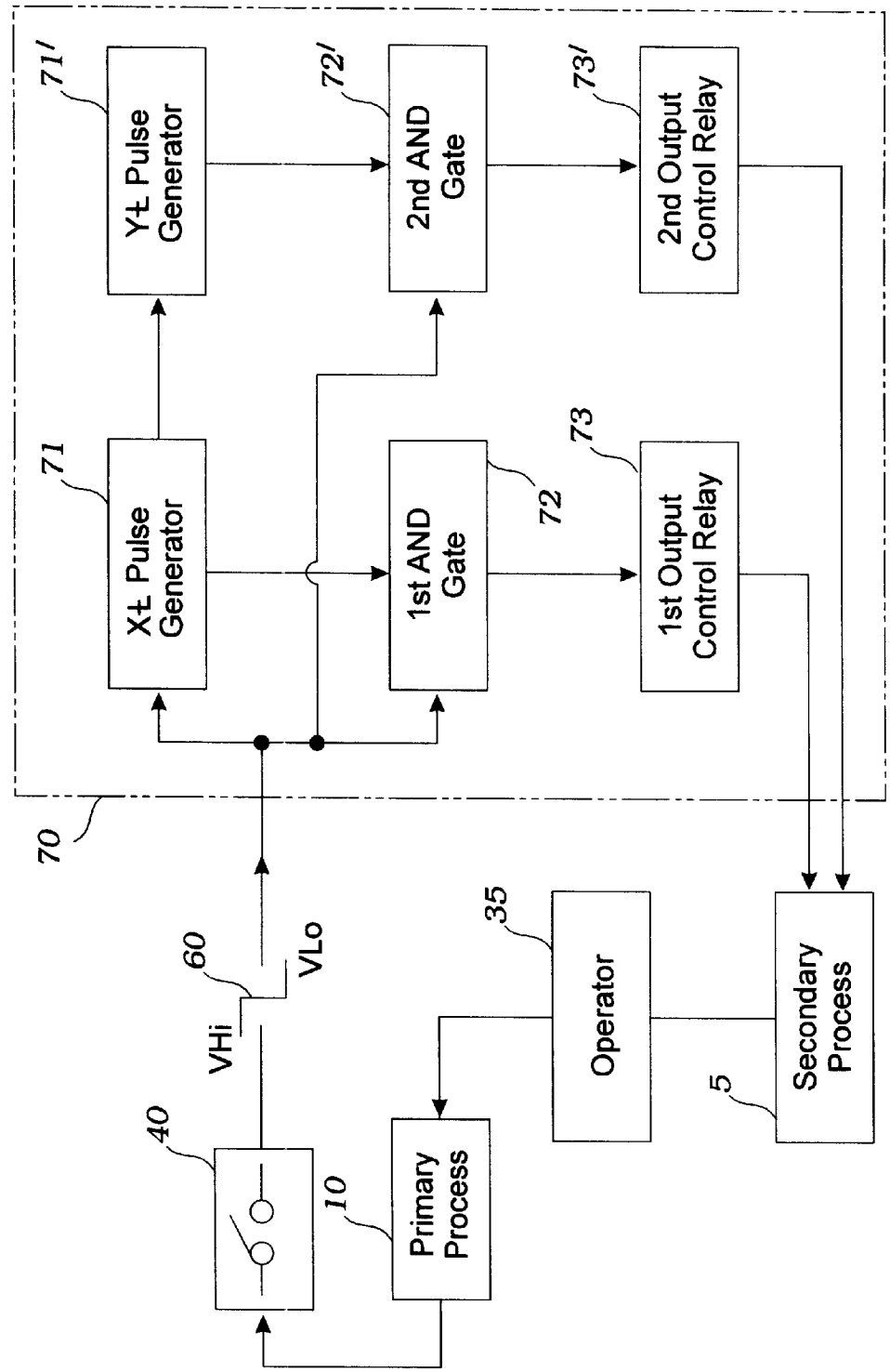
FIG. 2 is a block diagram of operation of an actuating device used in the preferred embodiment and is enabled for receiving the output signal, for interpreting the output signal and for producing a control effect.

The above described drawing FIGS. 1–2 illustrate the invention, a feedback control system apparatus and method using at least one operating personnel. The apparatus comprises a primary conducting means 10 (local process) containing a flowing medium 20, which may be a pressure system with a fluid at a pressure above ambient, a vacuum system with a fluid at a pressure below ambient, or an electrical conducting system supporting an electrical current. The apparatus further comprises a valving means 30 manually controllable by the operator 35. The valving means 30 may be, for instance, a water flow valve in a fluid system, or, alternately, a transistor or switch in an electrical circuit, with the valving means 30 and the operator 35, together, enabled, by virtue of a manual trigger 32 or similar actuator, for affecting the flowing medium 20 at a dispensing point 12 of the primary conducting means 10. Preferably, the affecting of the flowing medium 20 is a throttling effect such as with the handle or trigger in a garden hose valve.

The apparatus further comprises a transducing means 40, such as a pressure or sound transducer of any well known type, engaged with the primary conducting means 10 by mechanical or electrical joining in any common manner such that the transducing means 40 has an intimate relationship with the primary conducting means 10; and, therefore, with the flowing medium 20 as well. The transducing means 40 is engaged with the primary conducting means 10 at a local or remote location relative to the operator 35. The transducing means 40 is enabled, by its sensitivity, for detecting pulses, or other variations, transmitted within the flowing medium 20 by action of the valving means 30. For instance, if the valving means 30 is closed for an instant, a pressure wave, or pulse, is transmitted through the flowing medium 20, and this rise and fall of pressure in the flowing medium 20 is detectable by the pressure transducer means 40 or acoustic coupler, pulse detector, etc.. The transducing means 40 is further enabled, when the transducer switch opens or closes through manipulation of the valving means 30, for producing an output signal 60, such as an electrical signal, voltage rise, etc., related to the pulses in the flowing medium 20. A single pulse in the flowing medium may be programmed for producing a single pulse, a train of pulses or voltage state change as the output signal.

The apparatus further comprises an actuating means 70, enabled by any common circuit design for receiving the output signal 60 of the transducing means 40, and for processing information such as pulses in the output signal 60. Preferably, as shown in FIG. 2, the actuating means 70 is enabled by a first pulse generator 71 for producing one internal time pulse with a time duration, or pulse width of, xt, upon each reception of output signal 60. If and when a second output signal 60 is received by a first AND gate 72 of the actuating means 70 during this time pulse period, xt, a first output control relay 73 is caused to change state. If no second output signal 60 is received by the actuating means 70 during this time period, xt, no output relay state change will occur. Therefore, in this example, it will take two actuations of the operator's trigger within a set time period to cause a relay state change to occur. When the actuating means 70 is configured for operating a second independent output control relay 73', a second time pulse with a time period, or pulse width of, yt, automatically begins on the trailing edge of the first period, xt. If and when an output signal 60 is received by a second AND gate 72' of the actuating means 70 during this second time period, yt, a second output control relay 73' will change state in a similar manner. Of course, more than two functions may be controlled by the operator 35 in this same manner. In this fashion, the operator 35 is able to remotely open and close either output control relay 73, 73' by simply manipulating the valving means 30 in a predetermined timed sequence as in fast repeated squeezing of trigger 32, slow repeated squeezes, or other sequencing. The actuating means 70 is thus enabled for producing control effects 80', 80" related to the output signal 60. For instance, if the actuating means 70 receives the second output signal 60 from the transducing means 40 within the time period xt, yt or both, the actuating means 70 output control relays may be enabled for actuating a valve, solenoid, signal lamp, or similar device or devices.

These devices can in turn cause secondary industrial processes 5 to occur and which have observable control effects, such as those caused by actuating signal lamps, starting motors, turning on heaters, blowers, injectors or pumping apparatus, etc. Also, these effects may be enabled in the flowing medium 20, as for example, as to chemical content, color, temperature, and the like.

In operation, the present invention, as described above, preferably comprises a feedback control method using at least one operating personnel. The method comprises moving the flowing medium 20 through the primary conducting means 10 by means of pressure or other motive force. The feedback control method further comprises valving the flowing medium 20 through operation of a manual device such as a valve, at the dispensing point 12 of the primary conducting means 10.

Preferably, the valving produces a throttling effect on the flowing medium 20. Preferably, the feedback control method further comprises the step of charging the primary conducting means 10 with either a fluid above ambient pressure, a vapor or fluid below ambient pressure, or an electrical current.

The feedback control method further comprises the step of causing the transducing means 40 to detect pulses transmitted within the flowing medium 20 by action of the valving means 30. For instance, if the valving means 30 is closed for an instant, the pressure wave generated, or pulse, is transmitted through the flowing medium 20. If the primary conducting means 10 contains a fluid, this pulse is conveyed in the form of a pressure wave. If the primary conducting means 10 contains a low pressure (vacuum), this pulse is conveyed in the form of a pressure differential. If the primary conducting means 10 is an electrical conductor, this pulse is conveyed in the form of an electrical pulse or step in voltage or current. The rise and fall of pressure in the flowing medium 20 is detectable by the pressure transducer, acoustic coupler or similar device.

Preferably, the feedback control method further comprises the steps of counting the pulses within a selected time duration. For instance, when the transducer switch opens or closes through manipulation of the valving means 30, a corresponding voltage level step output signal 60 is introduced to the actuating means 70. The step signal initiates a single electrical pulse internally with a predetermined time base or pulse width, xt. If the actuation means 70 is configured for the independent operation of a second or additional output control relay, another clean pulse with a predetermined time base, or pulse width, yt is automatically initiated internally at the end of the initial xt time width pulse. If and when a second output signal 60 is received by the actuating means 70 during the first pulse width time interval xt, a first control relay will toggle, or change state. If and when a second output signal 60 is received by the actuating means 70 during the second pulse width time interval yt, a second output relay will toggle in a similar fashion.

The feedback control method further comprises the step of producing the output signal 60, such as an electrical signal, voltage rise, etc., related to the pulses in the flowing medium 20. The transducing means 40 is further enabled, when the transducer switch opens or closes through manipulation of the valving means 30, for producing an output signal 60, related to the pulses in the flowing medium 20.

The feedback control method further comprises the step of receiving the output signal 60, by common and well known circuitry design for producing a control effect 80', 80" related to the output signal 60. For instance, if the actuating means 70 receives a selected signal from the transducing means 40, the actuating means 70 may be enabled for actuating a valve, solenoid, signal lamp, or similar device or devices. Preferably, the feedback control method further comprises the step of enabling the operator 35 to perceive the control effect 80', 80". The operator perception enabling means may function, for instance, by placement of a signal lamp in the visual field of the operator 35, or it may constitute a change in a secondary industrial process 5, for example, that the operator 35 is able to monitor with his senses. Alternately, the operator perception enabling means may function by making a change in the flowing medium 20, as to its color, chemical content, temperature, or other characteristics as discussed above.

Preferably, the feedback control method further comprises the step of producing a reaction in an independent secondary process 5, the reaction being dependent on the operator 35. Preferably, the feedback control method further comprises the step of enabling the operator 35 to perceive the control effect in the secondary process 5. For example, when the primary conducting means 10 is charged with an electrical current, and the actuating means 70 produces a second time width base pulse within a given time frame, the toggle switch output is enabled, turning on the control relay, which is connected to the secondary process 5. As an example, the primary conduction means may be a pipe system used for washing industrial parts with a solvent mixture, wherein the operator 35 is able to see the results of the washing process, i.e., its effectiveness. If the solvent mixture is recycled, it looses its effectiveness with time so that the operator 35 must determine visually when to start introducing new solvent mixture and depleting the used solvent mixture. By pressing the nozzle trigger fully twice in quick succession, a series of two pulses in the fluid are transmitted to the transducer which then signals a first valve device, for instance, for admitting new fluid into the system. When the effectiveness of the solvent washing process is again up to par as determined visually by the operator 35, a series of two quick trigger pulls sends two pulses which are interpreted for shutting down new solvent entry into the system. Further, in a separate drainage system (secondary process 5) which collects the used solvent and pumps it to a recycling process separate from the washing process, a second valve device may be actuated when the operator produces three pulses, by three quick trigger pulls, for receiving the drained solvent and a pump actuated for moving the drained solvent to the recycling apparatus. Therefore, both a primary system as well as a secondary system may be controlled by the actuation of the operator's valve 30 through the use of repetitive valving pulses in accordance with a predetermined code system.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. In a feedback control system using at least one operating personnel, an apparatus comprising:

a primary conducting means containing a flowing medium;

a valving means manually controllable by an operator, the valving means enabled for operator control of the flowing medium at a dispensing point of the primary conducting means;

a transducing means engaged with the conducting means and enabled for detecting pulses transmitted within the flowing medium by action of the valving means, the transducing means further enabled for producing an output signal corresponding to the pulses in the flowing medium; and an actuating means enabled for receiving the output signal of the transducing means, and further enabled for producing an operator observable control effect within the flowing medium.

2. The apparatus of claim 1 wherein the control effect within the flowing medium is a change in flow rate of the flowing medium.

3. The apparatus of claim 1 wherein the actuating means is enabled for counting the pulses within a selected time duration.

4. The apparatus of claim 1 further comprising a means for enabling the operator to perceive the control effect.

5. The apparatus of claim 1 further comprising a secondary process independent of the primary conducting means, the secondary process enabled for receiving the operator observable control effect from the actuating means for control of the secondary process.

6. The apparatus of claim 5 further comprising a means for enabling the operator to perceive the control effect in the secondary process.

7. The apparatus of claim 1 wherein the primary conducting means is a pressure system and the flowing medium is a fluid at a pressure above ambient.

8. The apparatus of claim 1 wherein the primary conducting means is a vacuum system and the flowing medium is a fluid reacting to a pressure below ambient.

9. The apparatus of claim 1 wherein the primary conducting means is an electrical conducting system and the flowing medium is an electrical current.

10. A feedback control method using at least one operating personnel, the method comprising the steps of:

a) directing a flowing medium through a primary conducting means;

b) valving the flowing medium through operation of a manual valving means by an operator at a dispensing point of the conducting means;

c) detecting pulses transmitted within the flowing medium by action of the valving means;

d) producing an output signal related to the pulses in the flowing medium;

e) producing a control effect in reaction to the output signal; and f) producing an operator detectable result of the control effect so as to enable the operator to determine further action.

11. The method of claim 10 wherein the valving produces a throttling effect on the flowing medium.

12. The method of claim 10 further comprising the step of counting the pulses within a selected time duration.

13. The method of claim 10 further comprising the step of enabling the operator to perceive the control effect.

14. The method of claim 10 further comprising the step of producing a reaction in an independent secondary process, the reaction dependent on the control effect.

15. The method of claim 14 further comprising the step of enabling the operator to perceive the control effect in the secondary process.

16. The method of claim 10 further comprising the step of charging the conducting means with a fluid above ambient pressure.

17. The method of claim 10 further comprising the step of charging the conducting means with a fluid below ambient pressure.

18. The method of claim 10 further comprising the step of charging the conducting means with an electrical current.

* * * * *